United States Patent [19]

Fink

[11] Patent Number: 5,249,595
[45] Date of Patent: Oct. 5, 1993

[54] VALVE, IN PARTICULAR FOR A PISTON-TYPE COMPRESSOR

[75] Inventor: Günter Fink, Schongau, Fed. Rep. of Germany

[73] Assignee: Hoerbiger Ventilwerke Aktiengesellschaft, Vienna, Austria

[21] Appl. No.: 741,567

[22] Filed: Aug. 7, 1991

[51] Int. Cl.⁵ .............................................. F16K 15/08
[52] U.S. Cl. ............... 137/454.4; 137/516.17; 137/516.21
[58] Field of Search ........... 137/454.4, 516.17, 516.19, 137/516.21, 516.23

[56] References Cited

U.S. PATENT DOCUMENTS

| | | |
|---|---|---|
| 881,516 | 3/1908 | Willaredt . |
| 3,082,512 | 3/1963 | Scheldorf . |
| 4,289,159 | 9/1981 | Ehemann et al. ............... 137/454.4 |
| 4,307,751 | 12/1981 | Mayer et al. ............... 137/454.4 X |

FOREIGN PATENT DOCUMENTS 550403 1/1943 United Kingdom .

*Primary Examiner*—Gerald A. Michalsky
*Attorney, Agent, or Firm*—Watson, Cole, Grindle & Watson

[57] ABSTRACT

A valve for a piston-type compressor includes a valve seating with throughflow channels, a closure piece for controlling these channels, a spacer and a spring means urging the closure piece against the valve seating and supported on an arrester which at the same time forms the limit stop for the closure piece. In order to anchor the valve parts on the valve seating before the installation of the valve, at least one sleeve serving as a transport securing means and as an assembly aid is provided, which is secured at one end on the valve seating or on the arrester, and the individual valve parts are pushed in the correct installation position onto the sleeve. The other end of the sleeve is widened. A tension screw passes through the sleeve in an axial direction. The sleeve can be rolled into an undercut annular groove of the valve seating and at the outer surface of the arrester end flush with the latter.

11 Claims, 2 Drawing Sheets

VALVE, IN PARTICULAR FOR A PISTON-TYPE COMPRESSOR

BACKGROUND OF THE INVENTION

The invention relates to a valve, in particular for a piston-type compressor, which is mounted in or on a housing, for example a cylinder head, and which is clamped tightly by means of at least one tension or clamping screw against a seating surface of the housing. A valve according to the invention comprises a valve seating with throughflow channels, a closure piece controlling the latter, a spring means urging the closure piece against the valve seating and an arrester for the closure piece, and at most one spacer or guide ring between the valve seating and the arrester.

Valves of this construction are known. They are pressed into the cylinder head from the cylinder side and are screwed tight and thus secured with the aid of a relatively long tension screw passing from the upper side of the cylinder head through to the valve seating. With a valve of this construction it is not readily possible, at least not without a special construction of the relatively long tension screw, to pre-assemble the valve parts on the premises of the manufacturer of the valves. Rather, it is necessary to deliver the valve parts, packed in sets, to the compressor manufacturer and to assemble them there using more or less complicated assembly aids, to press them into the cylinder head and finally, after removing the assembly aids, to clamp them tightly and to secure them by means of the tension screw.

In practice, during assembly it repeatedly happens that the valve parts are incorrectly assembled by assembly personnel who have not been specifically trained in the valve sector, or that individual valve parts, in particular the spring rings, are clamped between adjacent valve parts, for example between a spacer or a guide ring and the valve seating or the arrester. During assembly, the thin valve parts may slide into the separating gap between the adjacent valve parts without this being noticed by the assembly personnel. When the valve is tightly clamped they are clamped in there. This not only disturbs the proper operation of the valve but also causes undesirable breakages of valve parts. It is even possible for broken pieces to reach the cylinder and damage the compressor.

To remedy this, the attempt was made in the case of one valve construction to connect the guide ring and the buffer plate forming the arrester to one another before assembly of the valve, that is to say, either to produce them from one piece or to stick them together with adhesive. Both measures are relatively expensive, and moreover have not proved successful in practice. Breakages have occurred which have repeatedly led to complaints.

SUMMARY OF THE INVENTION

The object of the present invention is to develop further the valves known hitherto of the construction stated above such that they can be pre-assembled at the valve manufacturer's works and such that it is thus ensured that the valve parts can be installed in the correct installation position and the valves can be centrally mounted in or on the compressor as a complete structural unit.

By means of the invention, this object is achieved in that the valve parts are held tightly on the valve seating or on the arrester, in addition to the tension screw or screws and before assembly of the valve using said tension screw(s) by at least one sleeve serving as a transport securing means and an assembly aid. The sleeve is secured with one end on the valve seating or on the arrester, and the other valve parts, including a spacer if one is provided, are pushed in the correct installation position onto the sleeve, another end of the sleeve is widened to anchor the valve parts. A deformable sleeve is thus used which connects the valve parts in the non-installed state of the valve to the valve seating or to the arrester so that the valve can be mounted as a complete structural unit, transported and simply installed in the compressor. Here, an incorrect installation position of the valve parts is not possible. Moreover, the pre-assembled valve can be tested by the valve manufacturer before delivery for proper functioning, for example for sealing.

Once the valve is installed, the sleeves themselves have no special function to fulfill. The tight clamping and thus also the securing in position of the valve parts with respect to one another is then performed by the additional screw connection or by another clamping securing the valve in or on the cylinder head. The additional expense arising from one or indeed a plurality of additional sleeves is negligible, because by using appropriate tools, assembly of the valve parts is substantially simplified, so that the assembly costs overall are even reduced and stability in assembly is increased. The small additional costs of the sleeves are more than compensated for thereby.

U.S. Pat. No. 3,082,512 discloses a compressor valve wherein the valve parts are connected to one another by a deformable hollow rivet instead of by one or more tension screws. This deformable hollow rivet has at one end a rivet head closing it and which is anchored in a recess of the valve seating. A rivet shaft passes through a flexible valve ring and an arrester above which the shaft is pressured, after heating its end, to form a further rivet head. This known hollow rivet is thus not a transport securing means or an assembly aid, but is the sole and final connection of the valve parts to one another. The hollow rivet is not provided in addition to one or more tension screws, but instead of the tension screw(s) which it replaces. The known compressor valve thus differs fundamentally from the construction according to the invention.

In a preferred embodiment of the invention, a tension screw passes through at least one sleeve during assembly of the valve. This it the simplest and probably the most used embodiment of the invention. Preferably, a sleeve and the tension screw passing through it are arranged in the valve axis. In deviation therefrom, however, it is also conceivable to provide two or more sleeves for each valve, the task thereof being simply to connect the valve parts before the final installation of the valve in a compressor to form a functional installation unit.

A further simple embodiment of the invention consists in the sleeves being rolled, injected or stuck with adhesive by means of their one end in an undercut annular groove of the valve seating or of the arrester. Here, to anchor the sleeves, annular grooves which are simple and inexpensive to produce simply by turning are necessary in an upper part of the valve seating or at an end of the arrester, the thread in the valve seating or in the arrester for the tension screws being in no way impaired if the annular groove or the annular grooves are slightly larger in diameter than the thread.

At their unsecured ends remote from the valve seating or the arrester, the sleeves may end within the thickness of the pushed-on valve parts, or at most flush with the outer surface thereof, so that the sleeves in no way hinder assembly and seating of the valve in the cylinder head.

The sleeves may be of metal, for example of steel, light metal or brass, but in accordance with the invention they may also advantageously comprise thermoplastic synthetic material. They can then be manufactured simply, for example by injection moulding, and just as simply be secured to the valve seating or to the arrester.

The construction according the invention is suitable both for pressure valves and for suction valves or compressors, and also for valve sets comprising suction and compression valves, for example for concentric valve combinations.

BRIEF DESCRIPTION OF THE DRAWINGS

The attached drawings illustrate, by way of example, embodiments of the invention.

DETAILED DESCRIPTION OF THE PREFERRED EMBODIMENTS

Figure 1:
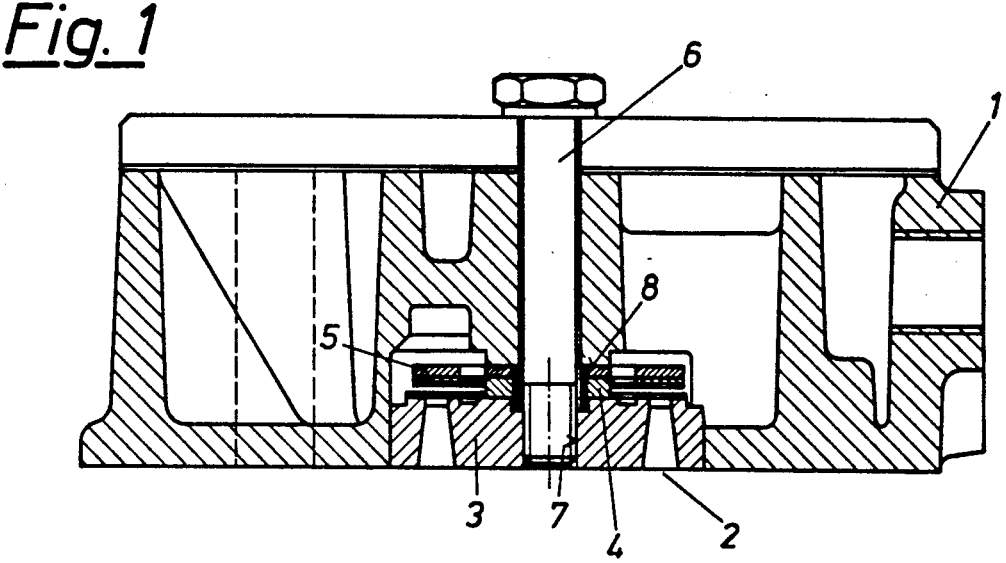
FIG. 1 shows a pressure valve according to the invention, installed in a cylinder head, in axial central section.

The valve 2 installed, in accordance with FIG. 1, in a cylinder head 1 of a compressor, is a pressure valve and comprises a valve seating or body 3, a spacer 4, constructed as a guide ring, and a buffer plate forming an arrester 5, between which further valve parts are arranged. The valve 2 is inserted, preferably pressed, with the valve seating 3 into a recess in the cylinder head 1 from the cylinder side, and is secured by means of a tension or clamping screw 6 which passes through the cylinder head 1, in a bore or channel running or extending along the axis thereof, and is screwed into a threaded bore 7 of the valve seating 3. The valve 2 is thus clamped tightly against a seating surface 8 of the cylinder head 1.

Figure 2:
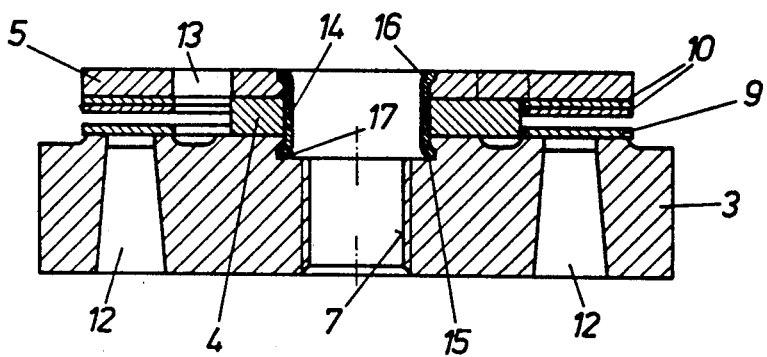
FIG. 2 shows an axial section thereof through the valve itself on a larger scale.
Figure 3:
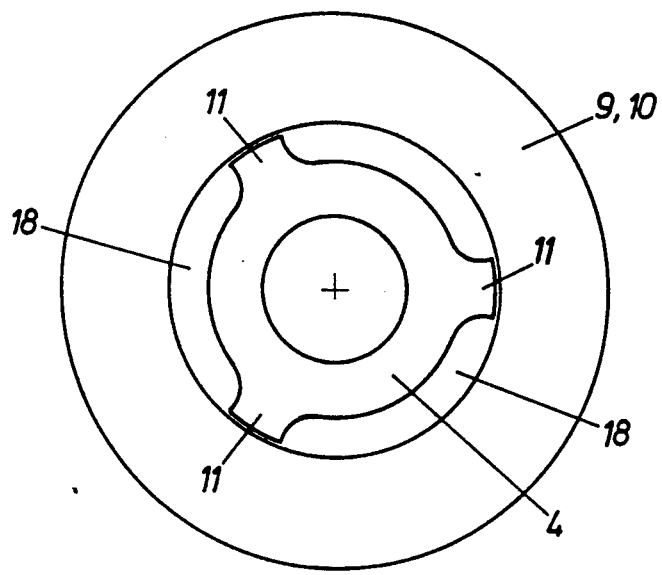
FIG. 3 shows a plan view of a spacer, constructed as a guide ring, with the closure or spring ring indicated.

FIG. 2 illustrates the valve in the dissembled state. It can be seen that there are arranged between the valve seating 3 and the arrester 5 a closure piece 9 and a spring means 10, which comprises two spring rings and which is guided to slide on-radial extensions 11 of the spacer 4, as can be seen in FIG. 3. The valve seating 3 is provided with throughflow channels 12 controlled by the closure piece 9, and the arrester 5 has through-passage slots 13.

In addition to the valve parts described, a sleeve 14 is provided which is secured at one end 15 on the valve seating 3 and of which the other end 16 projects upwards from the valve seating 3. In the example embodiment according to FIG. 2, to secure the sleeve 14 on the valve seating 3, there is provided in the latter an undercut, upwardly or outwardly tapering, frusto-conical annular groove 17 into which the end 15 of the sleeve 14 is rolled. The remaining valve parts, namely the spacer 4, the arrester 5 and also the closure piece 9 and the spring means 10, are pushed onto the sleeve 14 thus secured on the valve seating 3. Subsequently, the end 16 of the sleeve 14 remote from the valve seating 3 is then widened so that the remaining valve parts are fixed and anchored on the valve seating 3.

FIG. 3 simply shows that the closure piece 9 and the spring means 10 are centered and guided on the radial extensions 11 of the spacer 4, as is generally known in valve construction. Through-passage openings 18 remain between the radial extensions 11 for the controlled medium to pass through.

Figure 4:
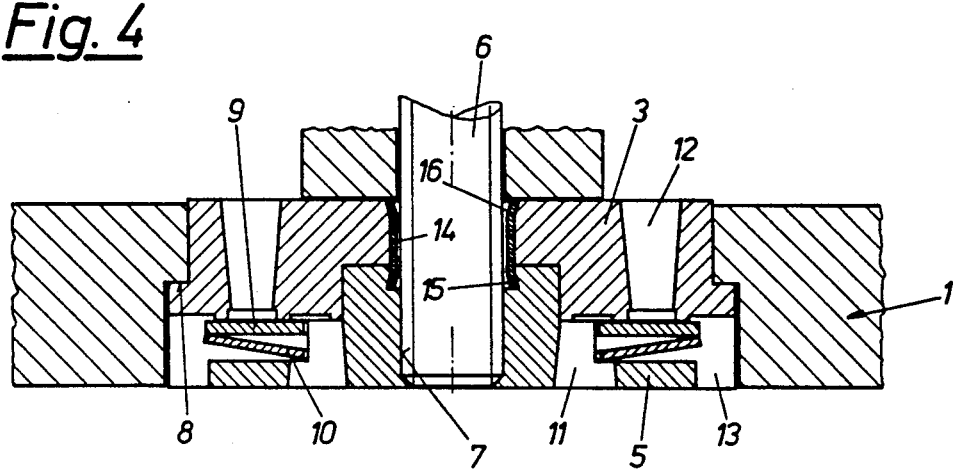
FIG. 4 shows an axial section through a suction valve according to the invention and FIG. 5 shows a concentric valve combination, constructed according to the invention, inserted in a cylinder head.

In the example embodiment according to FIG. 4, the construction according to the invention is shown on a suction valve. The arrester 5 is produced in one piece with the guide ring serving as a spacer 4. The sleeve 14 is in this case secured at its end 15 on the arrester 5 and the tension or clamping screw 6 is screwed into the arrester 5. The other end 16 of the sleeve 14 holds the valve seating 3 and thus also the remaining valve parts, namely the closure piece 9 and the spring means 10.

Figure 5:
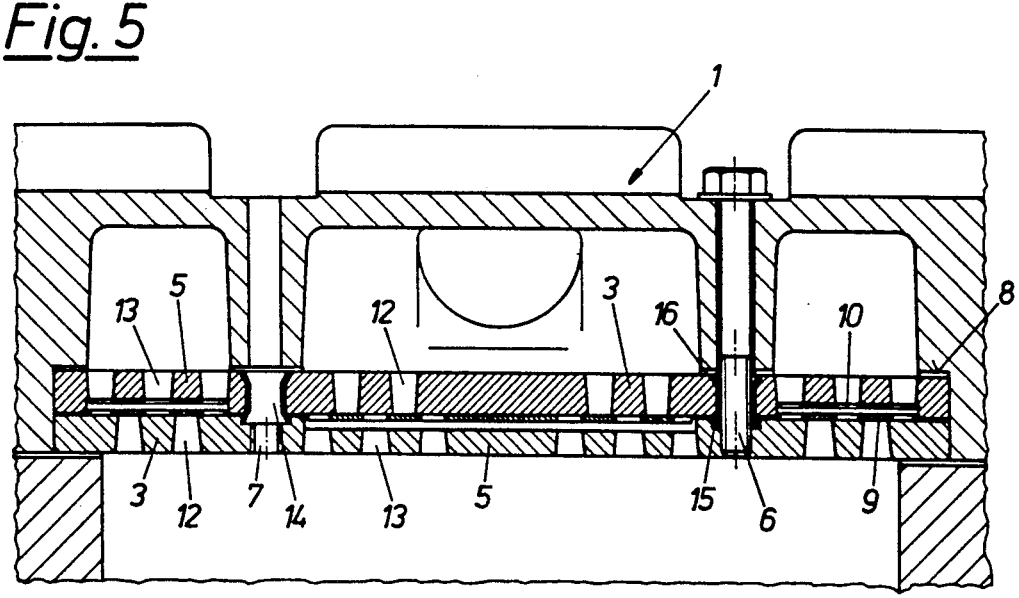

In accordance with FIG. 5, a concentric valve comprising an inner suction valve and an outer pressure valve is installed in a cylinder head 1. There, to ensure that the valve parts are held together, before installation in the cylinder head 1 a plurality of sleeves 14 are provided, of which two sleeves 14 can be seen in FIG. 5. The sleeves 14 are arranged outside the valve axis in the region of separation between the suction valve and the pressure valve. Associated with each sleeve 14 is a tension screw 6 which is screwed through the cylinder head 1 into the lower plate-shaped part of the concentric valve forming the valve seating 3 of the pressure valve and the arrester 5 of the suction valve. The remaining valve parts, in particular the closure piece 9 or two separate closure pieces and the spring means 10, are clamped between the two plate-shaped parts and together with the plate-shaped parts, are held in the correct installation position, before installation of the valve in the cylinder head by means of the sleeves 14.

The sleeves 14 simplify assembly of the valve, both as regards the assembly of the individual parts and as regards the installation of the complete valve in the compressor or in the cylinder head thereof, and they also have further advantages. If the valve parts are delivered loose to the manufacturer of the compressor and are only assembled by him once the valve 2 is installed in the cylinder head 1, it repeatedly happens that valve components, in particular the spring means 10 comprising rings or plates but also the closure piece 9, are clamped between the spacer 4 and the arrester 5 of the valve seating 3. This can result in damage to the valve parts, but in any case functioning of the valve is impaired.

The sleeves 14 provided in accordance with the invention, in addition to simplifying assembly of the valve, fix the valve parts on the valve seating 3 or on the arrester 5 in the correct installation position, so that when the valve is installed in the compressor no constrictions or other mis-positioning are possible. Advantageously, the entire valve may be assembled by the manufacturer of the valve. Transport and storage of the valve are then substantially simplified because the valve parts are fixed by the sleeve 14. Moreover, the manufacturer can carry out a function test, for example a seal test. On the premises of the manufacturer of the compressor, the assembled valve is then simply pressed into the recess provided in the cylinder head and is secured with the aid of one or more tension screws 6 which pass through the sleeves 14 and are screwed into the threaded bores 7 of the valve seating 3 or the arrester 5.

I claim:

1. A valve which is adapted to be tightly clamped by a clamping screw against a seating surface of a housing of a piston-type compressor, said valve comprising:
   a unitary valve body that defines throughflow channels;
   an arrestor spaced from said valve body;
   one of said valve body and said arrestor defining a threaded bore hole therein;
   a closure piece for controlling said throughflow channels positioned between said arrestor and said valve body;
   a spring means urging the closure piece against said valve body;
   a spacer located between the valve body and the arrestor;
   a sleeve positioned within the spacer and clamped at opposite ends to said valve body and said arrestor to secure said arrestor to said valve body and said closure piece and spring means therebetween, said sleeve providing a through hole therethrough, and
   a clamping screw which non-engagingly extends through said through hole in said sleeve and is threadingly engaged with said threaded bore hole.

2. A valve according to claim 1, wherein said opposite ends of said sleeve provide outwardly extending lips which fit within correspondingly shaped annular grooves in said valve body and said arrestor.

3. A valve according to claim 2, including adhesive connecting said lips with said respective annular grooves.

4. A valve according to claim 2, wherein said annular groove of said arrestor is located on a surface thereof facing away from said valve body.

5. A valve according to claim 1, wherein said sleeve is made of a thermoplastic synthetic material.

6. A valve which is adapted to be tightly clamped by at least one clamping screw against a seating surface of a housing of a piston-type compressor, said valve comprising:
   a unitary valve body that defines throughflow channels;
   an arrestor spaced from said valve body;
   one of said valve body and said arrestor defining a threaded bore hole therein;
   a closure piece for controlling said throughflow channels positioned between said arrestor and said valve body;
   a spring means urging the closure piece against said valve body;
   a spacer located between the valve body and the arrestor;
   a sleeve positioned within the spacer, said sleeve having a through hole therethrough and defining first and second ends, said sleeve being clamped at said first end to said valve body and securing said closure piece and spring means to said valve body, said second end having an outwardly-extending lip, and
   a clamping screw which non-engagingly extends through said through hole in said sleeve and is threadingly engaged with said threaded bore hole.

7. A valve according to claim 6, wherein said valve body defines an annular groove and said first end of said sleeve defines an outwardly-extending lip which fits within said annular groove.

8. A valve according to claim 6, wherein said sleeve is made of a thermoplastic synthetic material.

9. A valve which is adapted to be tightly clamped by at least one clamping screw against a seating surface of a housing of a piston-type compressor, said valve comprising:
   a unitary valve body that defines throughflow channels;
   an arrestor spaced from said valve body;
   one of said valve body and said arrestor defining a threaded bore hole therein;
   a closure piece for controlling said throughflow channels positioned between said arrestor and said valve body;
   a spring means urging the closure piece against said valve body;
   a spacer located between the valve body and the arrestor;
   a sleeve positioned within the spacer, said sleeve having a through hole therethrough and defining first and second ends, said sleeve being clamped at said second end to said arrestor and securing said closure piece and spring means to said arrestor, said first end having an outwardly-extending lip, and
   a clamping screw which non-engagingly extends through said through hole in said sleeve and is threadingly engaged with said threaded bore hole.

10. A valve according to claim 9, wherein said arrestor defines an annular groove and said second end of said sleeve defines an outwardly-extending lip which fits within said annular groove.

11. A valve according to claim 9, wherein said sleeve is made of a thermoplastic synthetic material.

* * * * *

UNITED STATES PATENT AND TRADEMARK OFFICE
CERTIFICATE OF CORRECTION

PATENT NO. : 5,249,595

DATED : October 5, 1993

INVENTOR(S) : Fink

It is certified that error appears in the above-identified patent and that said Letters Patent is hereby corrected as shown below:

Title Page:

In the heading insert:

[30] Foreign Application Priority Data

Aug. 7, 1990 [AT] Austria................1656/90

Signed and Sealed this

Fifteenth Day of March, 1994

Attest:

BRUCE LEHMAN

Attesting Officer     Commissioner of Patents and Trademarks